United States Patent [19]

Tamaki et al.

[11] Patent Number: 4,616,407

[45] Date of Patent: Oct. 14, 1986

[54] INSULATING METHOD FOR ROTARY ELECTRIC MACHINE

[75] Inventors: Akinobu Tamaki; Ken Kimura, both of Hyogo; Takeshi Kawakami; Masao Irie, both of Nagasaki, all of Japan

[73] Assignee: Mitsubishi Denki Kabushiki Kaisha, Tokyo, Japan

[21] Appl. No.: 563,440

[22] Filed: Dec. 20, 1983

[30] Foreign Application Priority Data

| Dec. 20, 1982 | [JP] | Japan | 57-225670 |
| Dec. 20, 1982 | [JP] | Japan | 57-225671 |
| Dec. 20, 1982 | [JP] | Japan | 57-225672 |
| Feb. 4, 1983 | [JP] | Japan | 58-17694 |
| Mar. 3, 1983 | [JP] | Japan | 58-36116 |
| Mar. 3, 1983 | [JP] | Japan | 58-36117 |
| Mar. 3, 1983 | [JP] | Japan | 58-36124 |

[51] Int. Cl.$^4$ ............................................. H02K 15/10
[52] U.S. Cl. ........................................ 29/596; 29/598; 310/208; 310/45; 427/116; 427/185
[58] Field of Search .................. 29/596, 598; 427/116, 427/185; 310/43, 45, 208; 336/205, 206

[56] References Cited

U.S. PATENT DOCUMENTS

| 2,997,776 | 8/1961 | Matter et al. | 427/185 |
| 3,618,929 | 11/1971 | Upchurch | 427/185 |
| 3,813,294 | 5/1974 | Dyer et al. | 427/116 |
| 4,224,090 | 9/1980 | Garner | 427/185 |

Primary Examiner—Mark Rosenbaum
Assistant Examiner—P. W. Echols
Attorney, Agent, or Firm—Sughrue, Mion, Zinn, Macpeak, and Seas

[57] ABSTRACT

A method for insulating a coil of a rotary electric machine resulting in improved insulating properties at critical coil ends. A mica sheet or mica tape is wound around a part of each coil to be inserted into a slot cut in an iron core of the rotary electric machine to thus form a first insulating layer. The coils thus treated are inserted into respective slots and are connected together and to external terminals as required. Each coil end is then covered in its entirety with a thermosetting resin. The thermosetting resin is hardened by heating to form a second insulating layer.

7 Claims, 14 Drawing Figures

INSULATING METHOD FOR ROTARY ELECTRIC MACHINE

BACKGROUND OF THE INVENTION

The invention relates to a method for insulating coils provided in rotary electric machines.

The following methods of insulating coils in high-voltage rotary electric machines are known in the art:

(1) In a first method, insulating tape is wound on a coil having a hexagonal form. The formed coil is then put in an impregnating tank where it is impregnated with resin under vacuum.

(2) In the second method, preformed coils are inserted into the slots of the iron core in the rotary electric machine and the leads are connected. After being subjected to an insulating treatment, the iron core with the coils is put in an impregnating tank where the coils are impregnated with resin under vacuum. Then, the resin is solidified by heating, thus forming an insulating layer. The second method is the so-called "post impregnation method".

(3) In a third method, insulating tape containing much resin is wound on each coil. The coil thus treated is heated and pressurized to provide an insulated coil.

The coils manufactured by the above-described methods have substantial insulating properties. However, the first and second methods are disadvantageous in that it is necessary to use a vacuum impregnation device, and the third method suffers from a drawback in that it requires the heating and pressurizing devices.

The coils of a high voltage rotary machine are generally hexagonal. Accordingly, in any one of the first, second and third methods, the work of winding a coil end including a coil end part, coil end nose, wiring parts and phase rings must be manually carried out for the most part. Accordingly, a large number of intricate manufacturing steps are required. Furthermore, the work of winding insulating tape on the coil is time consuming. Thus, there has been a strong demand for the provision of a method in which the coil can be insulated without using tape.

In addition, in the above-described methods, the coil end cannot have a sufficiently high insulating property when hardened by heating, and almost all faults due to poor insulation occur at the coil end. It is considerably difficult to satisfactorily insulate the coil end.

For instance, in a conventional post impregnation type coil insulating method employed extensively for rotary electric machines, preformed coils are wrapped with insulating tape and are then inserted into slots cut in the iron core of the rotary electric machine. The leads of the coils thus treated are connected, and the connecting parts thereof are then wrapped with insulating tape. Thereafter, the coils thus laid around the iron core are set in the impregnating tank and impregnated with insulating varnish under vacuum. Then, the insulating varnish thus applied is hardened by heating in a drying oven, thus forming an insulating layer.

Figure 1:
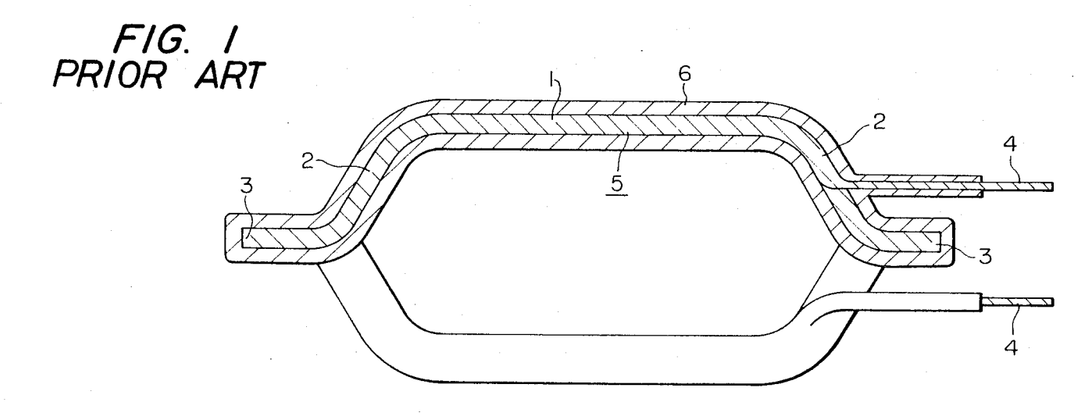
FIG. 1 is a plan view, with parts cut away, showing a coil for a rotary electric machine which is insulated according to a conventional coil insulating method.
Figure 2:
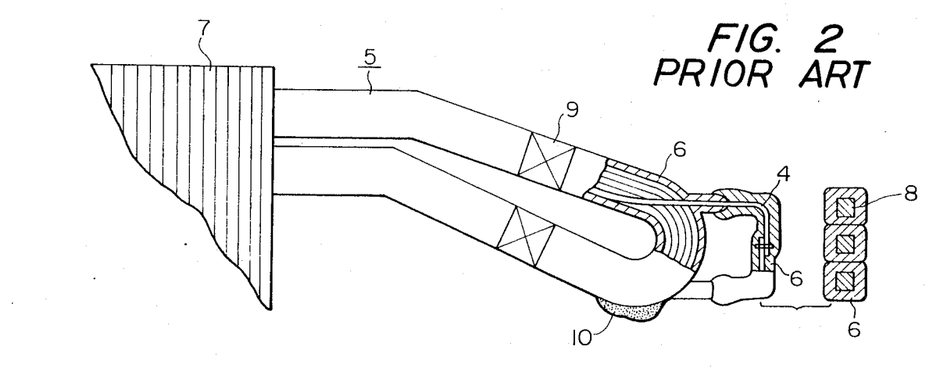
FIG. 2 is a sectional view, with parts cut away, showing the end portion of the coil which has been insulated according to the conventional method and its relevant components.

As shown in FIG. 1, each coil 5 comprises slot parts 1; coil end parts 2; nose parts 3; and lead parts 4. In the post impregnation coil insulating method, all of these parts 1, 2, 3 and 4 are wrapped with mica tape so that an insulating layer 6 is formed thereon. Thereafter, as shown in FIG. 2, the coil 5 is inserted into a slot in an iron core 7. The lead parts 4 are connected to phase rings 8 and the connecting parts thereof are wrapped with mica tape so that an insulating layer 6 is formed thereon. In order to support the coil end parts 2, a spacer 9 is inserted between the coil end parts 2, and a brace ring 10 is coupled to the outer end portions of the coil end parts 2. Thereafter, the assembly of the coils and the core is set in the impregnating tank. Under this condition, the coils are impregnated with insulating varnish under vacuum, and the insulating varnish thus applied is hardened by heating in the drying oven, thus forming an insulating layer 6.

In the above-described conventional method, before the coil is combined with the iron core, the slot parts 1 and parts of the coil end parts 2 can be wrapped with mica tape by using a machine such as a taping machine. However, winding the mica tape on the nose parts 3 and the lead parts 4 and on the connecting parts of the lead parts 4 and the phase rings 8 after the coils 5 have been inserted into the core 7 must be carried out manually. Thus, the work of winding the mica tape on these parts is low in efficiency, and time consuming. Moreover, the formed insulating layer 6 does not always have a sufficient insulating property even after the impregnated insulating varnish has been hardened by heating. Again, almost all faults due to poor insulation occur at the coil end.

SUMMARY OF THE INVENTION

Accordingly, an object of the invention is to provide a method for insulating coils in a rotary electric machine in which the above-described drawbacks accompanying a conventional coil insulating method have been eliminated, the number of steps for insulating the coil is reduced, and the coil ends, which before were liable to become defective, are improved in insulating properties, irrespective of configuration.

The foregoing object of the invention has been achieved by the provision of a method for insulating a coil provided in a rotary electric machine in which, according to the invention, mica sheet or mica tape is wound on a part of each wound coil which is to be inserted into a slot cut in an iron core of the rotary electric machine, thus forming a first insulating layer. After the coils thus treated have been inserted into the respective slots and connected, each coil end is covered, in its entirety, with a solventless thermosetting resin having a glass transition temperature of $-40°$ to $+200°$ C. Then, the thermosetting resin applied to each coil end is hardened by heating, thus forming a second insulating layer.

A specific feature of the invention resides in the step of forming the second insulating layer by coating with thermosetting powder synthetic resin, using a fluidized bed coating method, the coil ends of each coil on which the first insulating layers have been formed and which have been inserted into the respective slots of the iron core and connected. In this method, after the coils have been preliminarily dried, a first fluidized bed coating operation is carried out, the coil end or the like having the second insulating layer is heated with a ring-shaped heater, and the second fluidized bed coating operation is carried out. The heating operations with the ring-shaped heater and the second fluidized bed coating operation are carried out at least twice, whereby the coil end is coated with the thermosetting powder synthetic resin.

Another specific feature of the invention which has achieved the foregoing object resides in that the coil ends on which the first insulating layers are formed and which are inserted into the slots of the iron core and are suitably connected are, in their entirety, coated with thermosetting powder synthetic resin according to a powder coating method, and are totally impregnated with an impregnating varnish having the same grade thermosetting resin as the above-described powder. Further, both the powder and impregnating varnish are dried and hardened to form the second insulating layer.

The foregoing object of the invention has further been achieved by the provision of a method of insulating a coil provided in a rotary electric machine in which mica sheet or mica tape is wound on a part of each wound coil which is to be inserted into a slot cut in an iron core of the rotary electric machine and on parts of coil ends continuous with that part of the coil, thus forming a first insulating layer. After the coils have been inserted into the respective slots and connected, each coil end, except for the part which has been covered by the first insulating layer, is coated with thermosetting powder according to a fluidized bed coating method. Then, the thermosetting powder applied to each coil end is hardened by heating, thus forming a second insulating layer. According to the invention, the fluidized bed coating method for forming the second insulating layer includes a preliminary step in which, before the coil is subjected to immersion, fluidizing air is blown into the fluid in the fluid tank to fluidize the fluid bed and vibrate the coil and the fluid tank; a first immersion step in which the coil which is being vibrated is immersed in the fluid bed, which is being vibrated and fluidized, for a predetermined period of time; an immersion stagnation step in which, when a predetermined period of time has passed, blowing of the fluidizing air is suspended to stop the fluidization of the fluid bed for a predetermined period of time; and a second immersion step in which, when the fluidization of the fluid bed has been stopped for a predetermined period of time, the fluidizing air is blown into the fluid bed to fluidize the latter again, after which the coil is taken out of the fluid bed.

In the invention, insulation of the coil end has been achieved by changing the supporting structure and the insulation design of the coil end.

Still further, the invention provides a post impregnation type coil insulating method for a rotary electric machine in which, according to the invention, insulating layers are formed by wrapping the slot parts and portions of the coil end parts of each coil with mica tape or mica sheet, and the noses, the lead parts and the phase rings are covered with insulating layers of a thermosetting resin such as epoxy resin or polyester resin.

Yet further, the invention provides a post impregnation type coil insulating method for a rotary electric machine in which insulating layers are formed by wrapping only the slot parts of each coil inserted into slots cut in the iron core of the machine with mica tape or mica sheet, with the coil end parts not being wrapped with the mica tape or mica sheet. The coils thus treated are assembled into the iron core and are suitably connected. Spacers and brace rings are coupled to the coils, and thereafter the coils together with the stator are impregnated with insulating varnish and the insulating varnish is hardened by heating so that the portions of the coils which extend on both sides of the iron core are covered with insulating layers of thermosetting resin.

DESCRIPTION OF THE PREFERRED EMBODIMENTS

An example of a coil manufactured according to a coil insulating method of the invention will now be described. First, conducive to a full understanding of the invention, a coil of a conventional rotary electric machine will be described with reference to FIG. 3.

Figure 3:
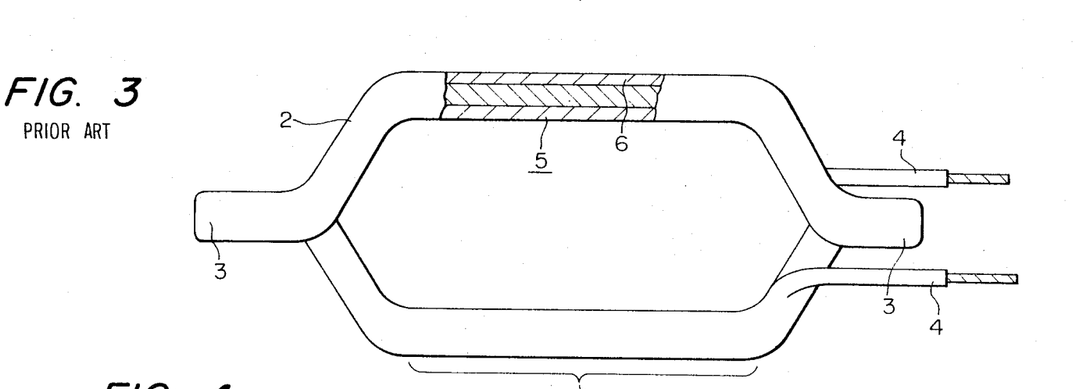
FIG. 3 is a front view, with parts cut away, showing an example of a stator winding in a conventional rotary electric machine.

In FIG. 3, reference numeral 1 designates slot parts of the coil which are inserted into slots in an iron core; 2, coil end parts; 3, noses; and 4, leads. These form the coil. Mica tape or mica sheet 6 is wound on these parts. The coil thus treated is heated and pressurized as necessary. Then, the coil is further insulated by winding tape thereon and subjected to vacuum impregnation as necessary.

Figure 4:
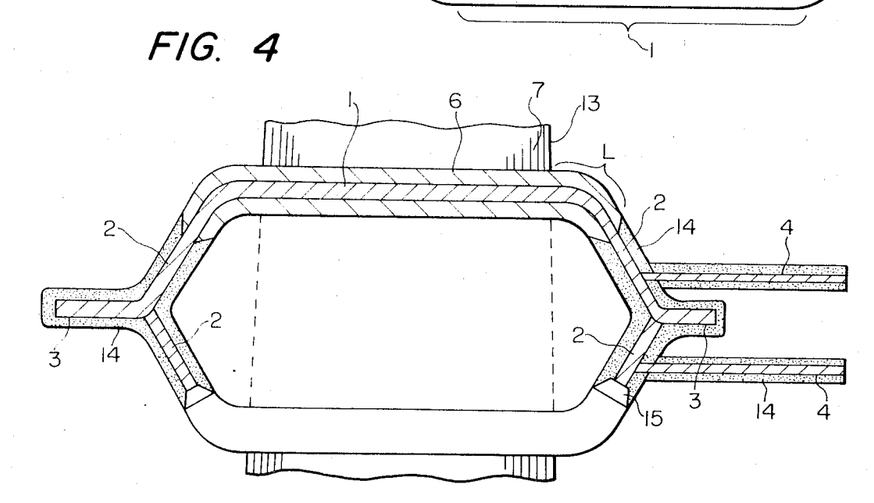
FIG. 4 is a front view, with parts cut away, showing an example of a stator winding in a rotary electric machine manufactured according to a coil insulating method of the invention.
Figure 5:
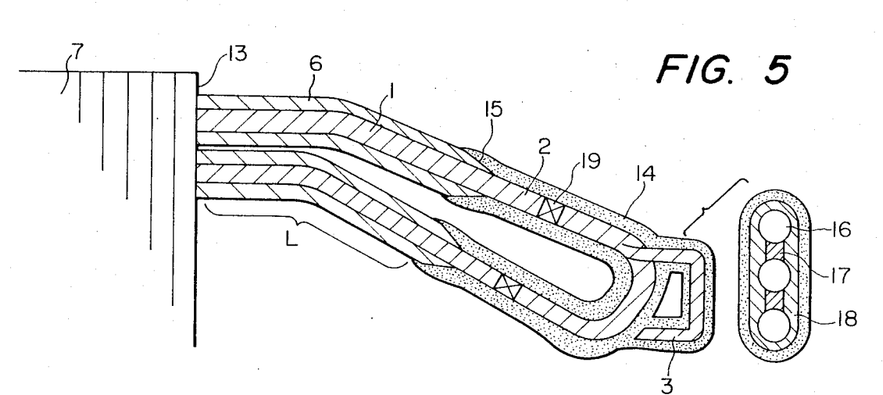
FIG. 5 is a longitudinal sectional view of the coil end shown in FIG. 4.

A first embodiment of a coil manufactured according to the method of the invention is shown in FIGS. 4 and 5. The coil has slot parts 1, coil end parts 2, noses 3 and leads 4 which are similar to those of the coil manufactured according to the conventional method. However, it should be noted that a first insulating layer 6 of the slot part is formed of mica tape or mica sheet which is wound not only on the part of the coil which is inserted in a slot of the iron core 7, but also on the parts of the coil which extend, by a predetermined length L, from both ends of the iron core 7. The length L is determined according to the desired insulation breakdown voltage. For instance, the length L is set to 20 mm or longer for a rotary electric machine of the 3 KV class, and to 30 mm or longer for a rotary electric machine of the 6 KV class.

As shown in FIGS. 4 and 5, the coil end parts 2 are covered with second insulating layers 14. More specifically, not only the coil end parts 2 but also the noses 3, the leads 4 and all or parts of the wiring parts are covered with the second insulating layers 14. The second insulating layers 14 are made of thermosetting synthetic resin having a glass transition temperature of $-40°$ to $+200°$ C. Examples of suitable thermosetting synthetic resins are epoxy resin, polyester resin, esterimide resin, polymide resin, silicon resin, acrylic resin and polyurethane resin. The reason why the glass transition temperature is set to $-40°$ to $+200°$ C. is that, if it is lower than $-40°$ C., the mechanical strength of the second insulating layer is insufficient, and if higher than $+200°$ C., the second insulating layer is liable to crack. It is effective for the second insulating layer to have a thickness of 0.05 to 6 mm.

The gap lengths between the coils and the suitable thickness are selected according to the class of voltage applied. The first insulating layer 6 and the second insulating layer 14 should overlap one another for at least 10 mm in the case of a rotary electric machine of the 3 KV class and for at least 15 mm in the case of a rotary electric machine of the 6 KV class, as indicated at 15 in FIGS. 4 and 5. This is to strengthen the interface of the two insulating layers.

In FIG. 5, the distance between phase rings 16 is at least 1 mm for a rotary electric machine of the 3 KV class and at least 2 mm for a rotary electric machine of the 6 KV class in order to prevent the coil from deteriorating due to corona discharge. In FIG. 5, reference numeral 17 designates a spacer and 18, insulating tape.

In accordance with the invention, the coil ends are supported by a spacing piece 19, such as a laminated plate, mica plate, glass laminate, mica tape or mica sheet felt, inserted between the coil ends.

The second insulating layer 14 and its relevant parts are formed as described above. The coil insulating method of the invention, which is utilized for forming these components as described above, will be further described with reference to specific examples.

First, coils (2 mm×8.5 mm), formed of copper wire subjected to double fiber treatment, are laid in two rows of eight layers each to form a preformed coil. Mica tape is then wound in four layers on that part of the coil which will be inserted into a slot of the iron core and those parts of the coil which extend by the predetermined length L from the ends 13 of the iron core 7, thus forming the first insulating layer 6.

Next, 72 coils, for instance, which have been formed as described above are inserted into the slots of the stator of a 3.3 KV induction motor (having 72 slots), and are suitably connected. Then, the phase rings 16 are installed.

Hereinafter, four examples will be described in detail with respect to the coils inserted into the slots and combined with the phase rings 16 according to the present invention.

EXAMPLE 1

The coils inserted into the slots and combined with the phase rings 16 were treated as follows: After the coils were heated to 160° C., parts, such as the coil ends 2, to be covered with the second insulating layer were immersed in a fluid immersion bath containing, for instance, an epoxy powder ("Scotch Cast No. 260" marketed by the 3M Co.) to form an epoxy resin film on these parts to a thickness of 1 to 2 mm. The epoxy resin film may be formed by other methods. For instance, other powder coating methods such as an electrostatic powder coating method and a flame powder coating method may be employed, or these methods may be employed in combination with the fluidized bed coating method. An electro-deposition method may be used in which an emulsion varnish is employed. Epoxy emulsion, such as ester imide emulsion, polyimide emulsion or polyester emulsion, and which is filled with mica, is especially effective. Furthermore, an immersion method using a thick film forming varnish which is thixotropic may be employed. In addition, at least two of the above-described powder coating, electrophoresis and immersion methods may be employed.

The above-described epoxy resin, polyester resin, ester imide resin, etc. may be used in the powder coating method or the immersion method. However, the epoxy resin is most effective because it can be readily handled and provides excellent characteristics.

After the epoxy resin film was formed as described above, the coils were heated at 160° C. in an oven for about one hour to solidify the resin film. At that point, the second insulating layers 14 were completely formed. At the connection 15 between the first and second insulating layers 6 and 14, the insulating layers were overlapped with each other to make the interface strong as described above.

The first and second insulating layers 6 and 14 were formed as described above. Thereafter, the stator was completely impregnated with epoxy resin and the epoxy resin solidified as required.

The stator with the coils thus formed was put in water and impressed with an AC voltage of 20 KV for one minute. The results of this breakdown voltage test were satisfactory. In addition, the stator was impressed with an AC voltage of 10 KV for one hundred hours in water. The results of this test were also found to be satisfactory.

In the above-described coil, mica tape having mica as insulating material was wound on the part of the coil to be inserted into the slot of the iron core 7. However, it goes without saying that, instead of the mica tape, a Prepreg insulating sheet may be employed, depending on the intended use of the rotary electric machine.

As is apparent from the above description, in the coil insulating method according to the invention, a mica sheet or mica tape is wound on the part of the coil which is to be inserted into the slot of the iron core and on the parts of the coil which extend on both sides of the iron core, thus forming the first insulating layer. Thermosetting resin is applied to the coil end parts including the noses and the leads, thus forming the second insulating layer. Accordingly, the number of steps required for insulating the coils is considerably small. Furthermore, the coil ends, which were heretofore especially liable to become defective, are free from such drawbacks with the use of the invention. Thus, the coil insulating method of the invention is considerably effective in practical use.

EXAMPLE 2

Figure 12:
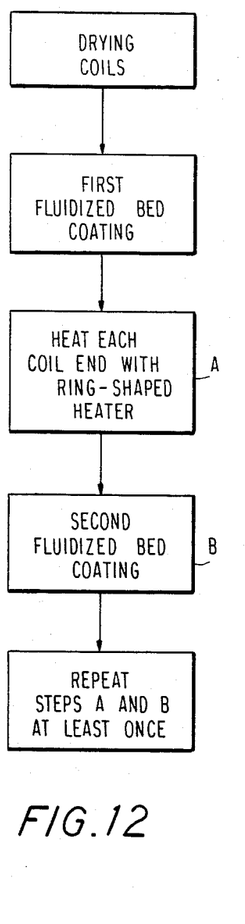
FIGS. 12-14 illustrate the sequence of steps performed in insulating methods according to the invention.

The coils were inserted into the slots and combined with the phase rings 16 and were then treated as follows (as illustrated in FIG. 12): The coils were preliminarily dried by heating at 140° C. Then parts, such as the coils ends 2 to be provided the second insulating layer, were immersed in a fluid immersion bath containing epoxy powder synthetic resin to form an epoxy resin film on these parts. Thereafter, the epoxy resin film formed on the coils ends was heated and made molten with a ring-shaped heater which employed infrared rays, a far-infrared ray heating source, or a "Nichrome" wire type heating source. In succession with this, the fluidized bed operation described above was carried out again. The above-described manufacturing steps were repeated six times, as a result of which the film formed had a thickness of 1 to 2 mm.

The manufacturing steps from the preliminary drying work to the second fluidized bed coating operation will be described in more detail. After the coil had been dried preliminarily, the heat produced in the preliminary drying operation was utilized and the coil end immersed in the fluid immersion bath to be coated with the resin. In this case, the film on wiring parts or the like having a small thermal capacity was relatively thin. In order to overcome this drawback, the ring-shaped heater provided near the fluid immersion bath and along the coil end was operated to heat the coil end. The temperature of the parts of small thermal capacity was increased quickly by this heating operation. Therefore, the coated film was made molten (twenty seconds to five minutes) so that the part covered by the thin film was sufficiently coated with the resin. In addition, the heat produced by the heating operation was utilized so that the coil end could be immersed in the fluid immersion bath again to carry out the second fluidized bed coating operation. This is performed at least twice until the required film thickness is obtained.

The above-described epoxy resin, polyester resin, ester imide resin, etc. may be used as powder in the method of the invention; however, epoxy resin is most effective because it can be readily handled and provides excellent characteristics.

After the epoxy resin film had been formed as described above, the coils were heated at 160° C. in an oven for about one hour to solidify the resin film. Thus, the second insulating layers 14 were completely formed. At the connection 15 between the first and second insulating layers 6 and 14, the insulating layers were overlapped to make the interface strong as described before.

The first and second insulating layers 6 and 14 are formed as described above. Thereafter, the stator was completely impregnated with epoxy resin, and the epoxy resin hardened as required.

The stator with the coils thus formed was placed in water and impressed with an AC voltage of 20 KV for one minute. The results of this breakdown voltage test were satisfactory. In addition, the stator was impressed with an AC voltage of 10 KV for one hundred hours in water. The results of this test were also found to be satisfactory.

In the above-described coil, mica tape having mica an insulating material is wound on the part of the coil which is to be inserted into the slot of the iron core 7. However, it goes without saying that, instead of mica tape, a "Prepreg" insulating sheet may be employed, depending on the intended use of the rotary electric machine.

As is apparent from the above description, in the coil insulating method according to the invention, mica sheet or mica tape is wound on the part of the coil which is to be inserted into the slot of the iron core and on the parts of the coil which extend on both sides of the iron core, thus forming the first insulating layer. Thermosetting powder synthetic resin is applied to the coil end parts including the noses and the leads by performing the fluidized bed coating operation at least twice, thus forming the second insulating layer. Accordingly, the number of steps required for insulating the coils is considerably small, and the thickness of the insulating layer can be made to be a desired value. Furthermore, the coil end parts, which were heretofore especially liable to become defective, are free from such a drawback with the use of invention, irrespective of the configuration thereof.

EXAMPLE 3

Figure 14:
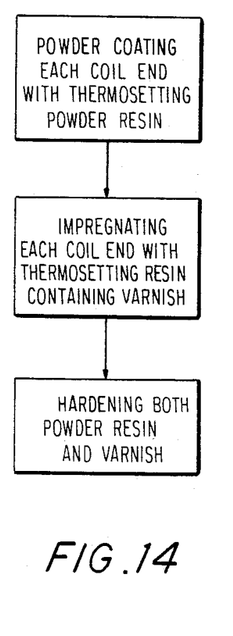

The coils inserted into the slots and combined with the phase rings 16 were treated as follows: After the coils were heated to 160° C., those parts, such as the coil end parts 2 to be provided with the second insulating layer, were immersed in a fluid immersion bath containing acid-anhydride-setting epoxy powder to form a semi-hardened epoxy resin film on these parts to a thickness of 1 to 2 mm (FIG. 14). The epoxy resin film may be formed by other methods. For instance, an electrostatic powder coating method, a flame powder coating method and/or a fluidized bed coating method may be employed for forming the epoxy resin film. At the connecting point 15 between the first and second insulating layers 6 and 14, these layers were overlapped to make the interface strong as described before. After the epoxy resin film has been formed, the stator is subjected to post impregnation by using acid-anhydride-setting epoxy resin, and the resin is hardened as required while the stator is being turned.

The stator with the coils thus formed was placed in water and supplied with an AC voltage of 20 KV for one minute. The results of this breakdown voltage test were satisfactory. In addition, the stator was supplied with an AC voltage of 20 KV for one hundred hours in water.

In the above-described coil, mica tape having mica as insulating material is wound on the part of the coil which is inserted into the slot of the iron core 7. However, again "Prepreg" insulating sheet may be employed, depending on the intended use of the rotary electric machine.

As is apparent from the above description, in the coil insulating method according to the invention, a mica sheet or mica tape is wound on the part of the coil which is to be inserted into the slot of the iron core and on the parts of the coil which extend on both sides of the iron core, thus forming the first insulating layer. Then, the thermosetting resin is applied to the coil end parts including the noses and the leads, thus forming the second insulating layer. Accordingly, the number of steps required for insulating the coils is considerably small. Furthermore, the coil end parts, which were heretofore especially liable to become defective, are free from such a drawback with the use of the invention.

EXAMPLE 4

Figure 13:
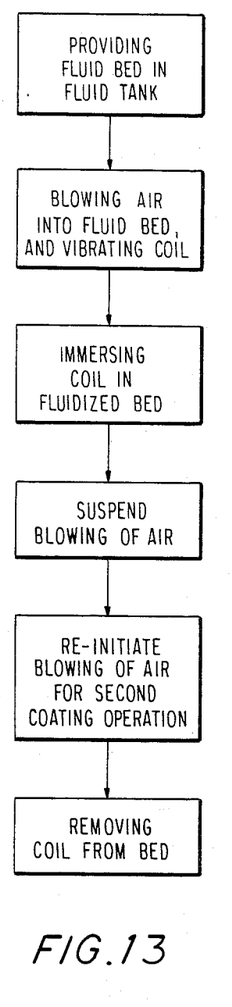

In this Example, the above-described second insulating layer 14 was formed according to a fluidized bed coating method illustrated in FIG. 13 and composed of the following steps: The first of the steps is a preliminary step. In this step, before the coil is immersed in the fluid tank, fluidizing air is blown into the fluid bed to fluidize the latter and vibrate the coil and the fluid tank in order to effectively carry out the immersion.

Thereafter, a first immersion step is effected. In this step, the coil which is being vibrated is immersed in the fluid bed in the fluid tank, which is also being vibrated, for a predetermined period of time so that a film of thermosetting powder is formed on the coil. When a predetermined period of immersion time has passed, an immersion stagnation step is effected. In this step, the blowing of the fluidized air is stopped to stop the fluidization of the fluid bed, thereby to stagnate the immersion so that formation of the film at parts having a small thermal capacity is accelerated.

The fluidizing air is subsequently blown into the fluid bed again to fluidize the latter, and immersion is again carried out for a predetermined period of time. As a result, another film is formed over the film which has been formed on the coil, including the parts having a small thermal capacity, in the above-described immersion stagnation step. This is a second immersion step.

When the film has been formed on the coil by immersing it in the fluid bed as described above, the coil is pulled upwardly and taken out of the fluid bed. If the coil is large and heavy, it may be taken out of the fluid bed by moving the fluid tank vertically with the coil held as it is.

According to the fluidized bed coating method having the various above described steps, a sufficiently thick film can be uniformly formed on the coil including the parts having a small thermal capacity.

The second insulating layer 14 and its relevant parts are formed as described above. The coil insulating method of the invention which is utilized for forming these components will be described with reference to a specific example.

First, coils with a copper wire subjected to a double glass fiber treatment, are laid in two rows of eight layers each to form a preformed coil. Mica tape is then wound in four layers on that part of the coil which will be inserted into a slot of the iron core and the parts of the coil which extend from the ends 13 of the iron core 6 within a predetermined length, thus forming the first insulating layer 11.

Next, 72 coils, for instance, which have been formed as described above are inserted into the slots of the stator of a 3.3 KV induction motor (having 72 slots); and are suitably connected. Then, the phase rings 16 are installed.

The coils inserted into the slots and combined with the phase rings 16 are treated as follows: After the coils are heated to 160° C., while the coils are being vibrated, parts, such as the coil end parts 2 to be covered with the second insulating layer 14, are immersed in the fluid bed containing acid-anhydride-setting epoxy powder in the fluid tank which is being vibrated. Then, the blowing of the fluidizing air is stopped for fifteen seconds, whereupon the fluidizing air is blown into the fluid bed again to fluidize the latter again. Thereafter, the coil is taken out of the fluid bed. As a result, an epoxy resin film of the order of 1 to 2 mm in thickness is formed on the parts of the coils, such as the coil ends 2, on which the second insulating layer 14 is to be formed.

The above-described epoxy resin, polyester resin, ester imide resin, etc. may be used as the fluidized bed coating method in the invention. However, epoxy resin is most effective because it can be readily handled and has other excellent characteristics.

After the epoxy resin film has been formed as described above, the coils are heated at 160° C. in an oven for about one hour to solidify the resin film. At that point, the second insulating layers 14 have been completely formed. At the connection 15 between the first and second insulating layers 6 and 14, the insulating layers are made to overlap with one another to make the interface strong. The first and second insulating layers 6 and 14 are formed as described above. Thereafter, the stator is completely impregnated with epoxy resin, and the epoxy resin is hardened as required.

A stator with coils thus formed was placed in water and supplied with an AC voltage of 20 KV for one minute. The results of this breakdown voltage test were satisfactory. In addition, the stator was supplied with an AC voltage of 10 KV for one hundred hours in water. The results of this test were also found to be satisfactory.

In the above-described coil, mica tape having mica as an insulating material is wound on the part of the coil which is inserted into the slot of the iron core 12. However, "Prepreg" insulating sheet may be employed depending on the intended use of the rotary electric machine.

As is apparent from the above description, in this coil insulating method according to the invention, the mica sheet or mica tape is wound on at part of the coil which is to be inserted into the slot of the iron core and on the parts of the coil which extend on both sides of the iron core, thus forming the first insulating layer. Then, epoxy powder is applied to the coil end parts including the noses and the leads, thus forming the second insulating layer. Accordingly, the number of steps required for insulating the coils is considerably small. Furthermore, the coil ends, which were heretofore especially liable to become defective, are free from such a breakdown due to the use the invention.

As further embodiments according to the present invention, the following three examples will be described in detail with reference to FIG. 6.

An insulating layer of thermosetting resin may be formed using a powder coating method, an electrophoresis coating method or an immersion coating method using thixotropic resin. However, these embodiments of the invention will be described with reference to the powder coating method by way of example.

EXAMPLE 5

Figure 6:
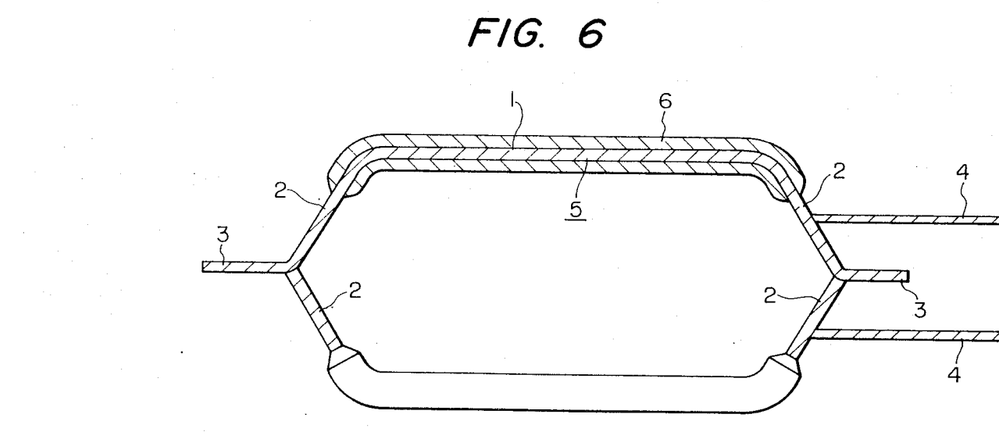
FIG. 6 is a plan view, with parts cut away, showing a coil for a rotary electric machine which is insulated according to a method of the invention.

As shown in FIG. 6, before each coil 5 is assembled into an iron core 7, insulating layers 6 are formed by wrapping the slot parts 1 and portions of the coil end parts 2 with mica tape or mica sheet. However, the nose parts 3 and the lead parts 4 are not insulated at all. The coil thus treated is inserted into the respective slot in the iron core 7.

Figure 7:
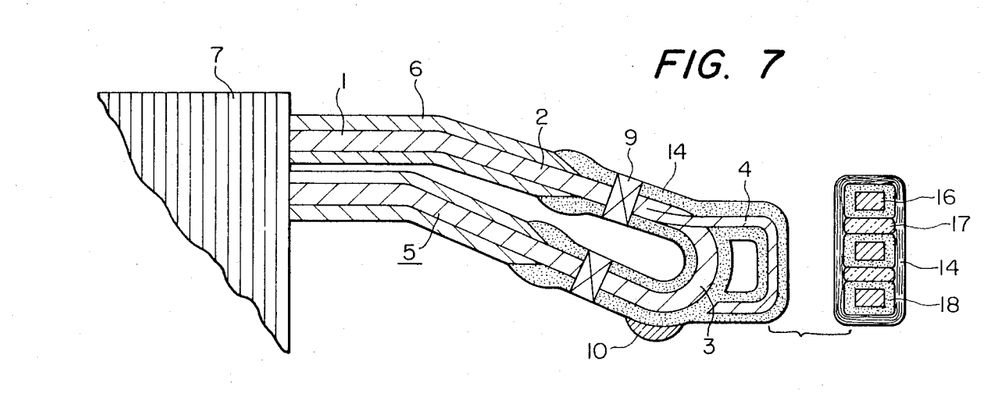
FIG. 7 is an explanatory diagram, partially as a sectional diagram, showing the end portion of a coil which has been insulated according to the method of the invention.

Thereafter, the lead parts 4 are wired and are connected to phase rings 16. Then, in order to facilitate the powder coating operation, the stator is preheated. After being sufficiently heated, the stator is set upright. Under this condition, each coil end part 2 is immersed in the fluidized bed coating material until the insulating layer 6 is suitably lowered into the fluidized bed coating material. As a result, all of the coil end parts 2, nose part 3, lead parts 4 and phase rings 16 are coated with powder resin such as epoxy resin or polyester resin. That is, an insulating layer 14 is formed on these parts, as shown in FIG. 7.

Thereafter, in order to support the coil end parts 2, spacers 9 and a brace ring 10 are coupled thereto. More specifically, the spacers 9 are fixedly provided at suitable positions between the coil end parts 2. The spacer 9 is made of an epoxy glass laminate or an insulating material such as felt impregnated with epoxy resin, which is excellent in both electrical and mechanical characteristics. The brace ring 10 is formed by winding a suitable number of turns of a material such as "Prepreg" glass roving material, excellent both in electrical and mechanical characteristics, on the outer end portions of the coil end parts in such a manner that it is in close contact with the coil 5.

Spacers 17 are inserted between the phase rings 16 suitably spaced from one another. The phase rings 16 and the spacers 17 are tied together with a tying material 18 such as insulating tape. Thereafter, the stator with the coils is put in the impregnating tank so that the coils are impregnated with insulating varnish under vacuum. The insulating varnish thus applied is solidified by heating in the drying oven.

EXAMPLE 6

As shown in FIG. 6, before each coil 5 is assembled into an iron core 7, insulating layers 6 are formed by wrapping the slot parts 1 and portions of the coil's end parts 2 with mica tape or mica sheet. However, the nose parts 3 and the lead parts 4 are not insulated at all. The coil thus treated is inserted into the respective slot in the iron core 7.

Thereafter, the lead parts 4 are wired, and the lead parts 4 are connected to phase rings 16. Spacers 17 are inserted between the phase rings 16 so that the phase rings are suitably spaced from one another. The phase rings 16 and the spacers 17 are tied together with a tying material 18 such as a piece of insulating tape.

Thereafter, in order to support the coil end parts 2, the spacers 9 and the brace ring 10 are coupled thereto. More specifically, the spacers 9 are fixedly provided at suitable positions between the coil end parts 2. The spacers 9 are made of an epoxy glass laminate or an insulating material such as felt impregnated with epoxy resin, which has excellent both electrical and mechanical characteristics. The brace ring 10 is formed by winding a suitable number of turns of a material such as "Prepreg" glass roving material, excellent both in electrical and mechanical characteristics, on the outer end portions of the coil end parts 2 in such a manner that it is in close contact with the coil 5.

Thereafter, the stator is put in the impregnating tank, so that the coils assembled into the stator are impregnated with insulating varnish. The insulating varnish thus applied is hardened by heating in a drying oven.

Figure 8:
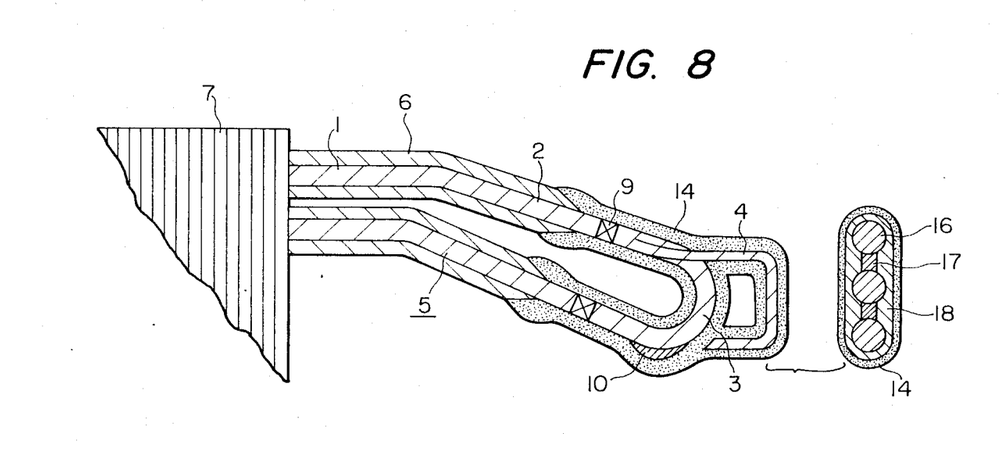
FIG. 8 is an explanatory diagram, partially as a sectional diagram, showing the end portion of a coil which has been insulated according to the method of the invention.

Then, in order to facilitate the powder coating operation, the stator is preheated. After being sufficiently heated the stator is set upright. Under this condition, each coil end part 2 is immersed in the fluid immersion until its insulating layer 6 is suitably lowered into the fluidized bed coating material. As a result, all of the coil end parts 2, nose part 3, lead parts 4 and phase rings 16 are coated with powder resin such as epoxy resin or polyester resin. That is, an insulating layer 14 is formed on these parts as well as on spacers 9 and brace ring 10, as shown in FIG. 8.

If the powder coating operation is performed immediately after the step of hardening the insulating resin, the aforementioned preheating step may be omitted.

EXAMPLE 7

As shown in FIG. 6, before each coil 5 is assembled into an iron core 7, insulating layers 6 are formed by wrapping the slot parts 1 and portions of the coil end parts 2 with mica tape or mica sheet. However, the nose parts 3 and the lead parts 4 are not insulated at all. The coil thus treated is inserted into the respective slot in the iron core 7.

Thereafter, the lead parts 4 are wired and the lead parts 4 are connected to phase rings 16. Spacers 17 are inserted between the phase rings 16 so that the phase rings are suitably spaced from one another. The phase rings 16 and the spacers 17 are tied together with a tying material 18 such as a piece of insulating tape.

Thereafter, in order to support the coil end parts 2, spacers 9 and a brace ring 10 are coupled thereto. More specifically, the spacers 9 are fixedly provided at suitable positions between the coil end parts 2. The spacer 9 is made of an epoxy glass laminate or an insulating material such as felt impregnated with epoxy resin, which has excellent both electrical and mechanical characteristics. The brace ring 10 is formed by winding a suitable number of turns of a material such as "Prepreg" glass roving material, excellent both in electrical and mechanical characteristics, on the outer end portions of the coil end parts 2 in such a manner that it is in close contact with the coil 5.

Then, in order to facilitate the powder coating operation, the stator is preheated. After being sufficiently heated, the stator is set upright. Under this condition, each coil end part 2 is immersed in the fluidized bed coating material until its insulating layer 6 is suitably lowered into the fluidized bed coating material. As a result, all of the coil end parts 2, nose parts 3, lead parts 4 and phase ring 16 are coated with powder resin such as epoxy resin or polyester resin.

That is, an insulating layer 14 is formed on these parts, as well as on brace ring 10 and spacers 9, as shown in FIG. 8.

Finally, the stator with the coils is put in the impregnating tank and the coils are impregnated with insulating varnish under vacuum. The insulating varnish thus applied is hardened by heating in the drying oven.

Figure 9:
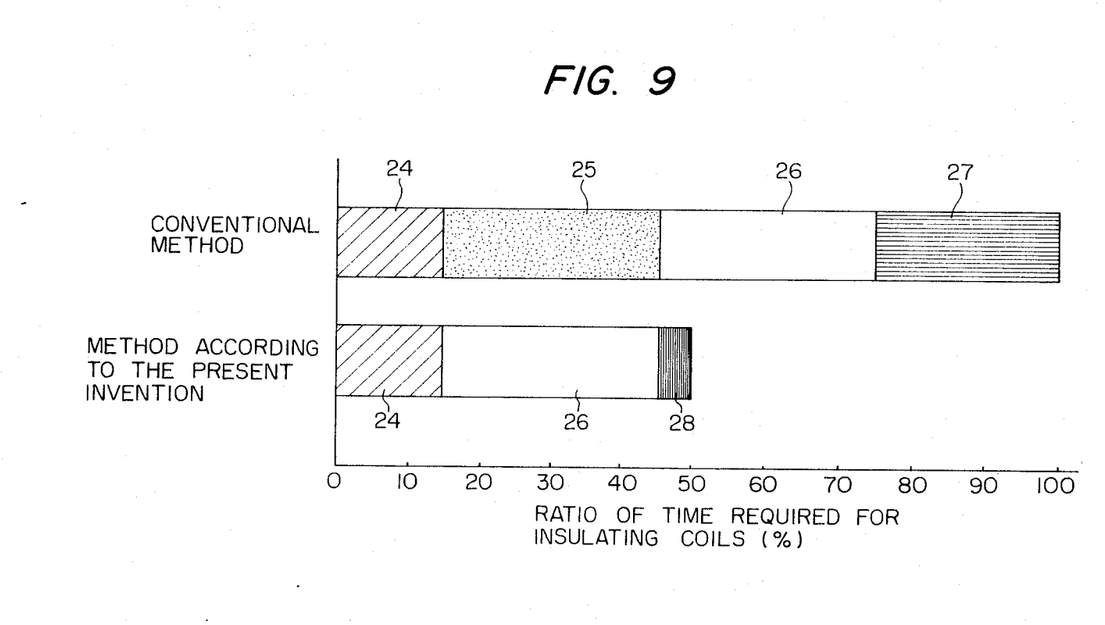
FIG. 9 is a graphical representation showing a comparison of the conventional method with the invention as to the time required for insulating the coils.

FIG. 9 shows a comparison of the results of applying the methods of Examples 5 to 7 with the conventional method and the time required for insulating the coils. The conventional method is roughly divided into a step 24 for insulating the coil slot part, a step 25 for insulating the coil end part, a step 26 for inserting the coils into the iron core and connecting them, and a step 27 for insulating the connected parts. These steps 24, 25, 26 and 27 occupy 15%, 30% 30% and 25% of the time required for the work, respectively. On the otherhand, the method of the invention includes the steps 24, 26 and 28 only (Step 28 includes the time required to insulate the end portions, etc., of the coils in accordance with the invention.) Accordingly, the time required for insulating the coils according to the method of the invention is 50% of that required for insulating the same coils according to the conventional method.

Figure 10:
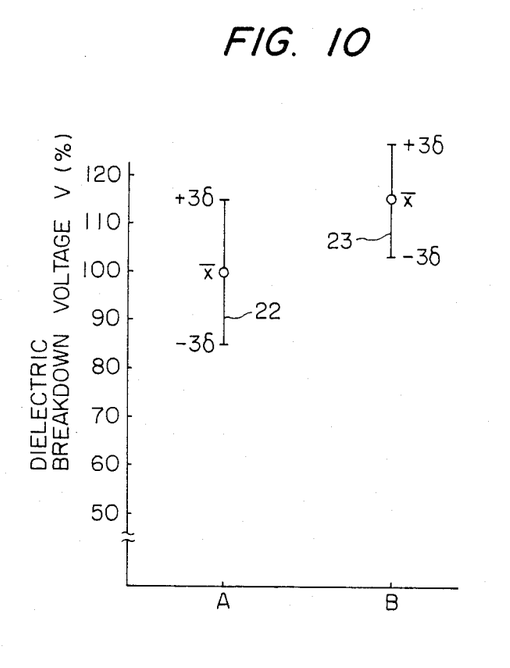
FIG. 10 is also a graphical representation indicating the dielectric breakdown voltage of coils insulated according to the conventional method and the method of the invention.
Figure 11:
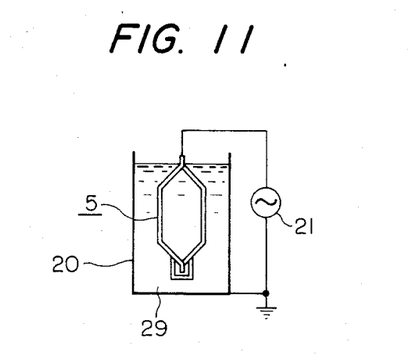
FIG. 11 is an electrical connection diagram showing how the dielectric breakdown test was carried out.

FIG. 10 indicates the short-time AC dielectric breakdown voltages of coils which are insulated according to the conventional method and the methods of Examples 5 to 7, measured in a 5% NaCl solution by increasing the AC voltage quickly. The test was carried out as follows: As shown in FIG. 11, each insulated coil 5 was put in a container 20 filled with a 5% NaCl solution 29, and the voltage of the AC source was quickly increased. With the average value x̄ of the short-time AC dielectric breakdown voltage of the coil 5 insulated according to the conventional method being taken as 100%, the dielectric breakdown voltages (%) are plotted along the vertical axis. The characteristic curves of the conventional method (22) and the invention (23) are indicated by A and B on the horizontal axis. As is apparent from FIG. 10, the insulating layer according to the characteristic 23 of the method (B) of the invention is superior to that according to the characteristic 23 of the conventional method (A). This means that the insulating layer 14 on the connecting parts of the lead parts 4 and the phase ring is improved in reliability according to the invention. In FIG. 10, reference character x represents the average value $\pm 3\sigma$.

The coil ends are held directly by the spacers 9 as described above. Therefore, when the coil ends are vibrated electromagnetically, they are more firmly supported than the conventional coil ends which are held through the insulating layers 6. Accordingly, with the invention, the effect of vibrational stress on the insulating layer 14 is reduced. Furthermore, if necessary, it is possible for the powder coating to be applied to the lead parts 14 and the phase rings 16 to which the high voltage is applied, after the same are wound using the mica tape.

In the above-described embodiments, the insulating layer 14 is formed according to the powder coating method. However, it goes without saying that the electrophoresis coating method of the immersion method using thixotropic resin may be employed for forming the insulating layer 14 on the coil end parts 2, the nose part 3, the lead parts 4 and the connecting parts of the leads 4 and the phase rings 16 with the same effects.

As is clear from the above description, the coils can be satisfactorily insulated in a short period of time according to the invention.

We claim:

1. A method for insulating a coil of a rotary electric machine, comprising the steps of:
    winding a mica sheet or mica tape around that part of each coil to be inserted into a slot cut in an iron core of said rotary electric machine, thus forming a first insulating layer;
    inserting said coils thus treated into respective slots of said core;
    covering an end of each said coil, defined as the portion of each said coil remaining uncovered by said first insulating layer plus a layer overlap region, in its entirety with a thermosetting synthetic resin; and
    hardening said thermosetting synthetic resin applied to each coil end by heating, thus forming a second insulating layer.

2. The method of insulating a coil of a rotary electric machine as claimed in claim 1, wherein the step of forming said second insulating layer by covering each said coil end with a thermosetting synthetic resin comprises a fluidized bed type coating method comprising the steps of:
    preliminarily drying said coils;
    performing a first fluidized bed coating operation on said preliminarily dried coils;
    heating each said coil end with a ring-shaped heater thereby forming a portion of said second insulating layer thereon; and
    performing a second fluidized bed coating operation, said step of heating with said ring-shaped heater and said second fluidized bed coating operation being carried out at least twice, whereby said coil end is coated with said thermosetting synthetic resin.

3. The method of insulating a coil as claimed in claim 2, wherein, in the step of forming said second insulating layer, said fluidized bed coating method further comprises:
    providing a fluid bed in a fluid tank;
    a preliminary step of, before said first fluidized bed coating operation, blowing fluidizing air into the fluid bed in said fluid tank to fluidize said fluid bed and vibrate said coil and said fluid tank;
    conducting said first fluidized bed coating operation by immersing said coil which is being vibrated in said fluid bed for a predetermined period of time;
    performing an immersion stagnation step of, when said predetermined period of time has passed, suspending blowing of said fluidizing air to stop fluidization of said fluid bed for a second predetermined period of time;
    conducting said second fluidized bed coating operation by performing a second immersion step when, after fluidization of said fluid bed has been stopped for said second predetermined period of time, said fluidizing air is again blown into said fluid bed to fluidize said fluid bed again; and
    removing said coil from said fluid bed, whereby a sufficiently thick film of thermosetting powder is formed even on parts of said coil having a small thermal capacity.

4. The method of insulating a coil as claimed in claim 1, wherein the step of forming said second insulating layer comprises steps of:
    applying to each coil end in its entirety thermosetting powder synthetic resin according to a powder coating method;
    totally impregnating each said coil end with an impregnating varnish having the same grade thermosetting resin as said powder resin; and
    drying and hardening both said powder resin and impregnating varnish to form said second insulating layer.

5. The method of insulating a coil as claimd in claim 1, wherein the step of forming said second insulating layer comprises:
    holding said coil end parts together with spacers and a brace ring;
    covering end portions of each coil extending on both sides of said iron core and end portions of said mica tape or mica sheet with an insulating layer of thermosetting resin;
    impregnating said coils together with an associated stator with an insulating varnish under vacuum; and
    hardening said insulating varnish thus applied by heating.

6. The method of insulating a coil as claimed in claim 1, wherein the step of forming said second insulating layer comprises:
    holding each said coil end together with spacers and a brace ring;
    impregnating said coils together with said iron core with an insulating varnish under vacuum;

hardening said insulating varnish thus applied by heating; and forming insulating layers of thermosetting resin on end portions of each coil extending on both sides of said iron core.

7. The method of insulating a coil as claimed in claim 1, wherein the step of forming said second insulating layer comprises:

covering end portions of each coil extending on both sides of said iron core and end portions of said mica tape or mica sheet with an insulating layer of thermosetting resin;

holding said coil ends together with spacers and a brace ring;

impregnating said coils together with said iron core with an insulating varnish under vacuum; and hardening said insulating varnish thus applied by heating.

* * * * *